UNITED STATES PATENT OFFICE.

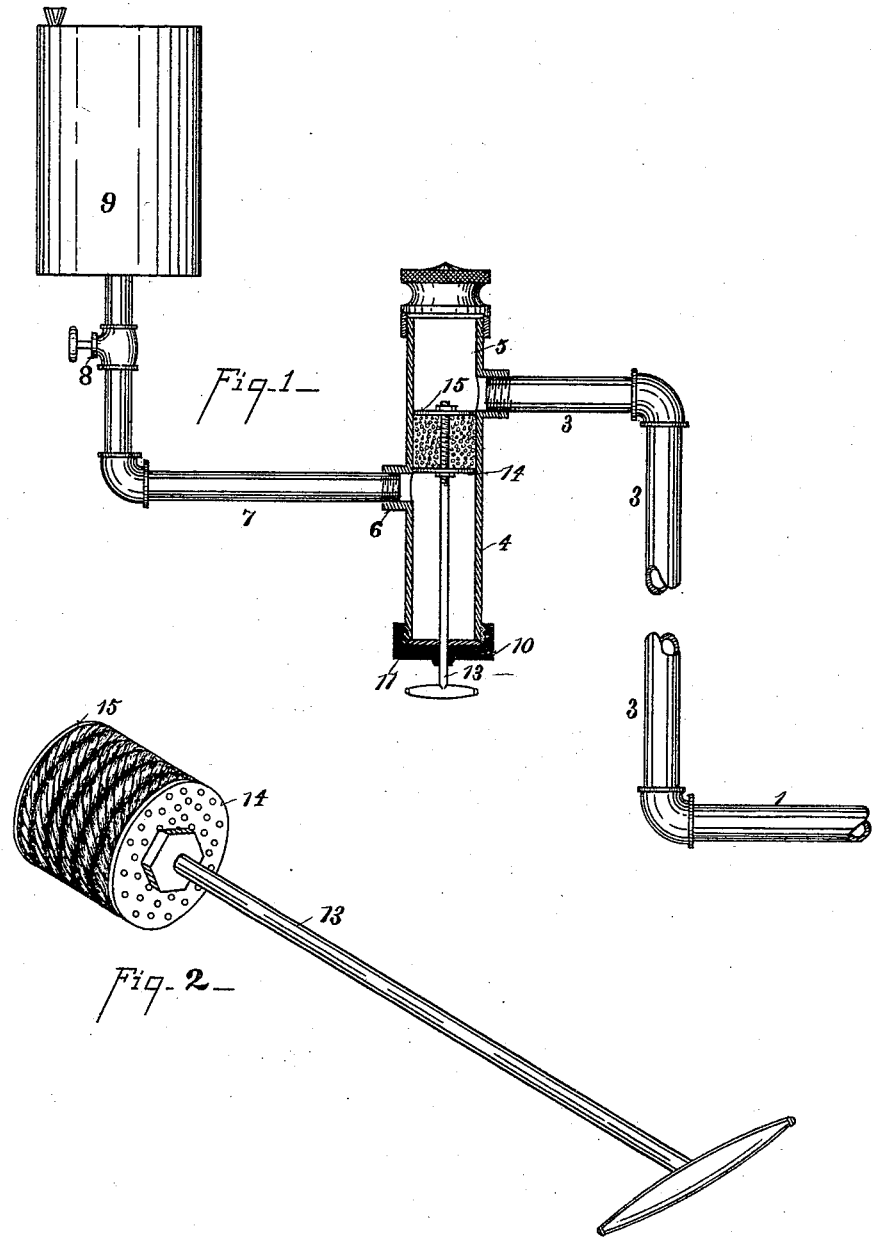

CHARLES WEISBROD AND EDWARD WEISBROD, OF HARTWELL, OHIO.

GASOLINE-STOVE.

SPECIFICATION forming part of Letters Patent No. 426,973, dated April 29, 1890.

Application filed December 26, 1889. Serial No. 334,949. (No model.)

*To all whom it may concern:*

Be it known that we, CHARLES WEISBROD and EDWARD WEISBROD, citizens of the United States, and residents of Hartwell, in the county of Hamilton and State of Ohio, have invented certain new and useful Improvements in Gasoline-Stoves, of which the following is a specification.

Our invention relates to a filter especially adapted to be used with gasoline-stoves, but is also adapted to filtering other liquids than gasoline.

The object of our invention is to provide a novel filtering device which can be readily attached to gasoline-stoves or other pipe-line supplies, and to so construct the filter that it can be readily taken apart to remove the deposits and apply new filtering material, all of which will be fully set forth in the description of the accompanying drawings, making a part of this specification, in which—

Figure 1 is a side elevation of our improvement, with the filter shown in section. Fig. 2 is a perspective view of the filter.

1 represents a pipe-line supply, for instance, for the burners of a gasoline-stove.

3 represents a pipe leading from the supply-pipe to the filter-chamber.

4 represents a stand-pipe or cylinder, which forms the filter-chamber.

5 the supply-chamber for the clear fluid above the filter.

6 represents an elbow or T connection for the main supply-pipe 7.

8 represents a cut-off valve cutting off the supply of liquid.

9 represents an oil-tank.

10 represents a cap provided with threads for engaging with threads on the bottom of the stand-pipe or cylinder 4.

11 represents a rubber gasket placed between the cap and the stand-pipe to make a water-tight joint. A rod 13 extends through the cap 10, and is rigidly secured thereto for turning such cap, and on the rod are arranged two perforated disks 14 and 15, between which is placed the fibrous filtering material, preferably composed of candle-wicking wound around the rod 13 and filling the space between the disks 14 and 15. The space in the stand-pipe or cylinder below the filter serves as a mud-well, in which the débris filtered from the liquid is deposited, to the bottom of which it drops by gravity. When it is desired to clean out the filter, the valve 8 is turned to shut off the supply, and cap 10 is unscrewed, carrying with it the rod 13 and attached parts. The rod can rotate in the disks 14 and 15 to permit the screwing and unscrewing of the cap 10, and when the filter is removed it clears the lower end of the stand-pipe or cylinder from deposited matter. If the filtering material or the wicking has become clogged so as to prevent a free circulation of the fluid through the material, it may be replaced by new filter material.

We have shown the device, as before stated, as adapted to be used with gasoline-stoves, as it thoroughly purifies the gasoline or carbon oil supplied to the burners 2 and prevents the pipe clogging up. It is readily cleaned and readjusted without disturbing the operation or position of the supply-pipes.

We are aware that wire-gauze has been arranged in a vapor-burner pipe; but wire-gauze alone will not filter out the gum in gasoline.

We are also aware that a cartridge composed of a tube of wire-gauze filled with gravel or shot, as asbestus fiber, has been arranged in a vapor-burner pipe, but the inequalities in the pipe prevent a tight fit of the wire-gauze, and the gasoline works up around the cartridge, in consequence of which the gasoline is imperfectly cleansed or filtered.

In our improved device the fibrous filtering material is wound between the two perforated disks until the proper size is attained, and then the filter is forced tightly into the stand-pipe, so that it packs itself in place, and all the gasoline is compelled to pass through the fibrous absorbent material, which effectually filters the gasoline.

The stand-pipe or cylinder is located between the tank and burner-pipes, and hence all the gasoline for many burners is filtered by one filtering device.

Having described our invention, what we claim is—

1. The combination, with a stand-pipe or cylinder having an inlet and outlet, of a filter composed of a rod, two foraminous disks, and a fibrous filtering and absorbing material confined between the disks, substantially as described.

2. The combination, with a stand-pipe or cylinder having an inlet and outlet, of a removable cap on the stand-pipe or cylinder, a rod connected with the cap, two foraminous disks on the rod, and a fibrous filtering material arranged between the disks and packed in the stand-pipe or cylinder, substantially as described.

3. A filtering device for insertion into a pipe or cylinder, consisting of a rod, two foraminous disks on the rod, and a fibrous filtering material wound between the two foraminous disks, substantially as described.

In testimony whereof we have hereunto set our hands.

CHARLES WEISBROD.
EDWARD WEISBROD.

Witnesses:
EDWARD BOYD,
T. SIMMONS.